(12) United States Patent
Sasaki et al.

(10) Patent No.: US 6,263,163 B1
(45) Date of Patent: Jul. 17, 2001

(54) FOCAL LENGTH DETECTOR OF A CAMERA HAVING A ZOOM LENS

(75) Inventors: Takamitsu Sasaki; Hiroshi Nomura, both of Saitama (JP)

(73) Assignee: Asahi Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/597,170

(22) Filed: Jun. 20, 2000

(30) Foreign Application Priority Data

Jun. 30, 1999 (JP) .................................... 11-185069

(51) Int. Cl.$^7$ .................................... G03B 17/00
(52) U.S. Cl. .................. 396/79; 396/80; 396/85; 396/87
(58) Field of Search .................. 396/72, 85, 87, 396/542; 359/694, 696, 697, 698

(56) References Cited

U.S. PATENT DOCUMENTS 5,327,184 * 7/1994 Nomura et al. .................. 396/87
5,790,903 * 8/1998 Iwaski et al. .................. 396/87
5,809,348   9/1998 Nomura et al. .
5,809,361   9/1998 Nomura et al. .

* cited by examiner

Primary Examiner—David M. Gray
Assistant Examiner—Rochelle Blackman
(74) Attorney, Agent, or Firm—Greenblum & Bernstein P.L.C.

(57) ABSTRACT

A focal length detector of a camera having a zoom lens includes a brush having three sliding contacts which are electrically connected to one another; a code plate having three code patterns and a ground pattern, the code plate and the brush being moved relative to each other according to a variation of the focal length of the zoom lens; and a focal-length detecting circuit which is connected to the three code patterns and the ground pattern. The ground pattern always contacts a specific sliding contact of the three sliding contacts. The three code patterns are arranged so that the three code patterns come into contact with the remaining two sliding contacts in predetermined combinations when the code plate and the brush are moved relative to each other.

16 Claims, 7 Drawing Sheets

FOCAL LENGTH DETECTOR OF A CAMERA HAVING A ZOOM LENS

BACKGROUND OF THE INVENTION

1. Field of the Invention

The present invention relates to a focal length detector of a camera having a zoom lens.

2. Description of the Related Art

A focal length detector of a camera having a zoom lens which is provided therein with a code plate, having predetermined code patterns, and a brush, whose sliding contacts are in sliding electrical contact with the code plate to detect the focal length of the zoom lens, is known. In this known type of focal length detector, the brush and the code plate move relative to each other during zooming according to the movement of a moving barrel of the zoom lens so that the focal length of the zoom lens is detected by detecting a combination of electrically-connected or disconnected code patterns (electrical-connection indication signals or zoom code data) via the brush. For instance, in cameras having a zoom lens whose moving barrel or barrels are driven to retract from a wide-angle extremity to even a housed position in the camera body when power of the camera is switched OFF, the housed position, the wide-angle extremity, the telephoto extremity and intermediate positions (different focal-length positions) between the wide-angle extremity and the telephoto extremity of a moving barrel of the zoom lens are each detected. In such cameras, the detectable number of the focal lengths between the wide-angle extremity and the telephoto extremity can be increased to substantially an infinite number in theory by counting two-bit repetitive patterns. However, in practice, the detectable number of the focal lengths is limited by the size of terminals of the code plate and the amount of relative movement between the code plate and the brush. In the case of a focal length detector in which one particular sliding contact of the brush and a corresponding particular conductive pattern of the code plate which remain in contact with each other are used as terminals for ground, the code plate needs to be provided with at least three conductive patterns including the aforementioned conductive pattern (i.e., two conductive patterns in the form of a two-bit repetitive pattern and a pattern for ground), or the brush needs to be provided with at least three sliding contacts including the aforementioned sliding contact, in order to obtain two-bit repetitive codes. In order to detect specific focal length positions such as the housed position, the wide-angle extremity and the telephoto extremity, the code plate further needs to be provided with at least one more conductive pattern or the brush further needs to be provided with at least one more sliding contact to obtain electrical-connection indication signals or zoom code data that are different from the aforementioned two-bit repetitive codes. Therefore, in such a focal length detector, the code plate or the brush needs to be provided with at least four conductive patterns or at least four sliding contacts, respectively, which are to be electrically connected to a focal length detecting circuit (a control circuit) of the camera. In such a conventional focal length detector, regardless of which of the code plate and the brush is electrically connected to the focal length detecting circuit, the brush is generally provided with four sliding contacts. However, from a view point of miniaturizing the camera including the focal length detector, preferably the number of sliding contacts of the brush is as small as possible.

SUMMARY OF THE INVENTION

The primary object of the present invention is to provide a focal length detector of a camera having a zoom lens, wherein the focal length detector is designed so small that it can be advantageously used to miniaturize the camera.

To achieve the former object mentioned above, according to an aspect of the present invention, a focal length detector of a camera having a zoom lens is provided, the focal length detector having a code plate and a brush which contacts with the code plate, the code plate and the brush being moved relative to each other according to a variation of the focal length of the zoom lens, and the focal length detector has a focal-length detecting circuit. The brush includes three sliding contacts which are electrically connected to one another. The code plate includes three code patterns and a ground pattern which are insulated from one another to be electrically connected to the focal-length detecting circuit. The ground pattern remains in contact with a specific sliding contact of the three sliding contacts regardless of the relative position of the code plate and the brush. The three code patterns come into contact with the remaining two of the three sliding contacts in predetermined combinations when the code plate and the brush are moved relative to each other.

According to this structure, since the brush needs to be provided with only three sliding contacts, specifically the width of the brush in a direction perpendicular to the direction of relative movement between the brush and the code plate can be made small, which is advantageous to miniaturize the camera. Still more, electrical-connection indication signals or zoom code data necessary to detect the focal length of the zoom lens can be obtained if only the brush and the code plate are provided with two sliding contacts and three conductive patterns, respectively, in addition to a particular sliding contact of the brush and a corresponding particular conductive pattern of the code plate for ground, so that the focal length detector can be designed small and compact without sacrificing the performance thereof, as compared with a conventional focal length detector.

Preferably, two of the three code patterns are formed on two contacting portions which are defined on the code plate to correspond to the remaining two of the three sliding contacts, respectively, and the remaining one of the three code patterns are formed to extend over the two contacting portions.

Preferably, two of the three code patterns are formed as two repetitive-pattern detecting terminals for detecting intermediate focal lengths between a wide-angle extremity and a telephoto extremity of the zoom lens, and the remaining one of the three code patterns is formed as a specific-code detecting terminal for detecting specific focal length positions of the zoom lens.

Preferably, the specific-code detecting terminal is electrically connected to the ground pattern via the brush when the zoom lens is at each of the wide-angle extremity and the telephoto extremity, and wherein one of the two repetitive-pattern detecting terminals and the specific-code detecting terminal are electrically connected to the ground pattern via the brush when the zoom lens is at a housed position behind the wide-angle extremity.

In an embodiment, one of the two repetitive-pattern detecting terminals, which is electrically connected with the ground pattern together with the specific-code detecting terminal when the zoom lens is at the housed position, is formed to extend over two contacting portions which are defined on the code plate to correspond to the remaining two of the three sliding contacts, respectively, and the specific-code detecting terminal and the other of the two repetitive-pattern detecting terminals are formed on the two contacting portions, respectively.

Preferably, the focal length detector further includes a zoom motor which is controlled to rotate forwardly and reversely to drive the zoom lens to vary the focal length; a zoom motor detector which detects a direction of driving of the zoom motor; and a position detecting device for determining whether the zoom lens is at one of a first focal length position and a second focal length position by referring to the direction of driving of the zoom motor when a common signal generated when the zoom lens is at one of the first focal length position and the second focal length position is detected via the three code patterns and the ground pattern.

In an embodiment, the common signal is detected at each of a wide-angle extremity and a telephoto extremity.

Preferably, the code plate and the brush are fixed to first and second lens barrels of the zoom lens, respectively, and one of the first and second lens barrels moves relative to the other.

Preferably, the code plate is formed as part of a flexible PWB.

Preferably, the code plate is fixed at a bottom of a groove formed on an inner periphery of a lens barrel of the zoom lens.

Preferably, the groove extends in a direction parallel to an optical axis of the zoom lens.

According to another aspect of the present invention, a camera is provided, including zoom lens; and a focal length detector which detects focal lengths of the zoom lens, the focal length detector including a code plate and a brush which slidably contacts with the code plate, the code plate and the brush being moved relative to each other according to a variation of the focal length of the zoom lens. The brush includes at least three sliding contacts which are electrically connected to one another. The code plate includes at least four code patterns which are insulated from one another, and one of the four pattern remains in contact with a specific sliding contact of the three sliding contacts.

Preferably, the zoom lens includes a moving barrel which advances from a camera body when the zoom lens is driven to effect zooming, the brush being fixed to the moving barrel so as to move relative to the code pattern when the zoom lens is driven to effect zooming.

According to another aspect of the present invention, a focal length detector of a camera having a zoom lens is provided, the focal length detector including a brush having three sliding contacts which are electrically connected to one another; a code plate having three code patterns and a ground pattern which are insulated from one another; the brush and the code plate being moved relative to each other according to a variation of the focal length of the zoom lens; and a focal-length detecting circuit which is electrically connected to the three code patterns and the ground pattern of the code plate. The ground pattern of the code plate always contacts with a specific sliding contact of the three sliding contacts regardless of the relative position of the code plate and the brush. The three code patterns of the code plate are arranged so that the three code patterns come into contact with the remaining two of the three sliding contacts in predetermined combinations when the code plate and the brush are moved relative to each other.

The present disclosure relates to subject matter contained in Japanese Patent Application No. 11-185069 (filed on Jun. 30, 1999) which is expressly incorporated herein by reference in its entirety.

BRIEF DESCRIPTION OF THE DRAWINGS

The invention will be described below in detail with reference to the accompanying drawings in which.

DESCRIPTION OF THE PREFERRED EMBODIMENT

Figure 1:
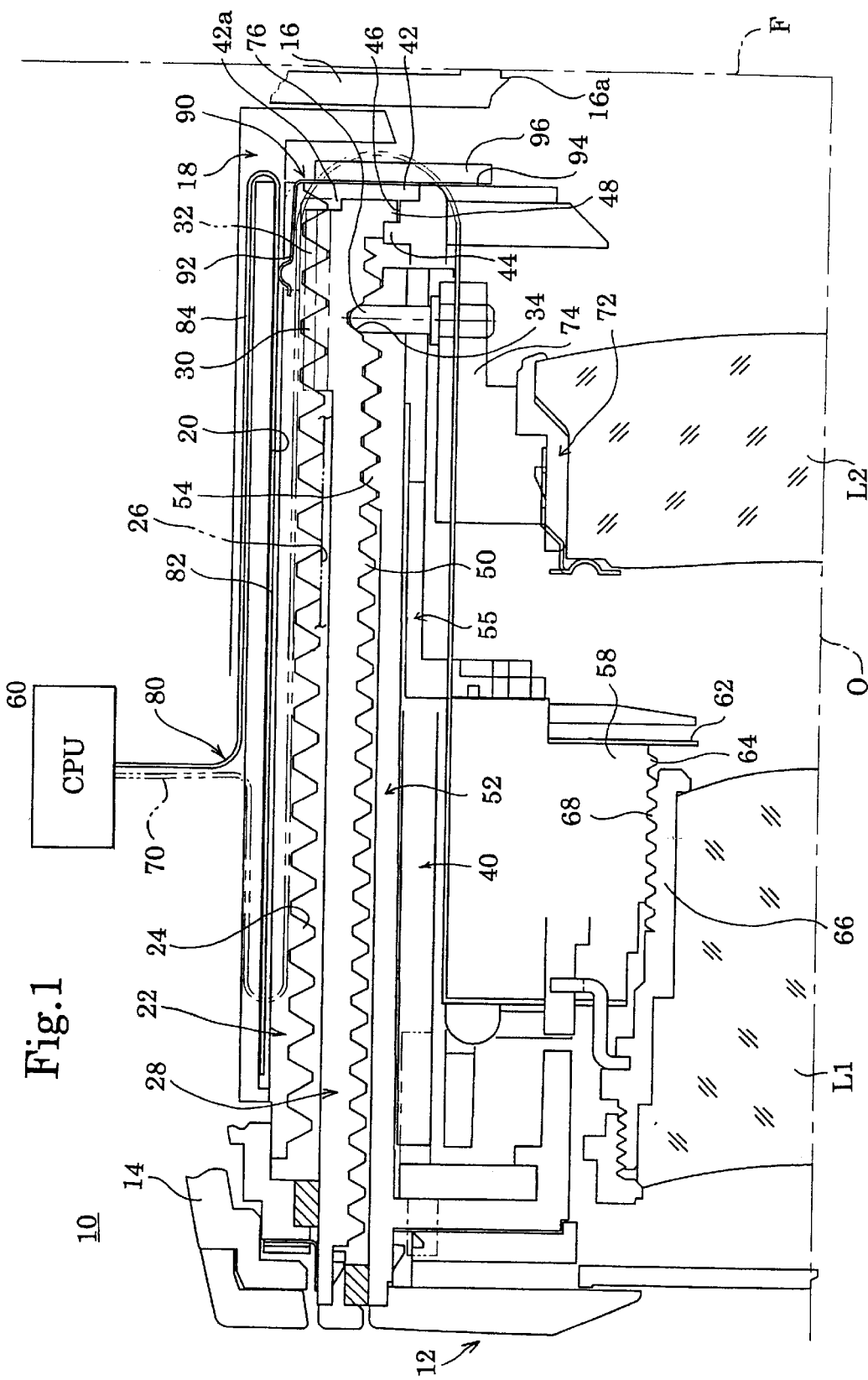
FIG. 1 is a longitudinal sectional view of an upper part of a zoom lens of a camera having a focal length detector according to the present invention, showing the zoom lens at a housed position.
Figure 2:
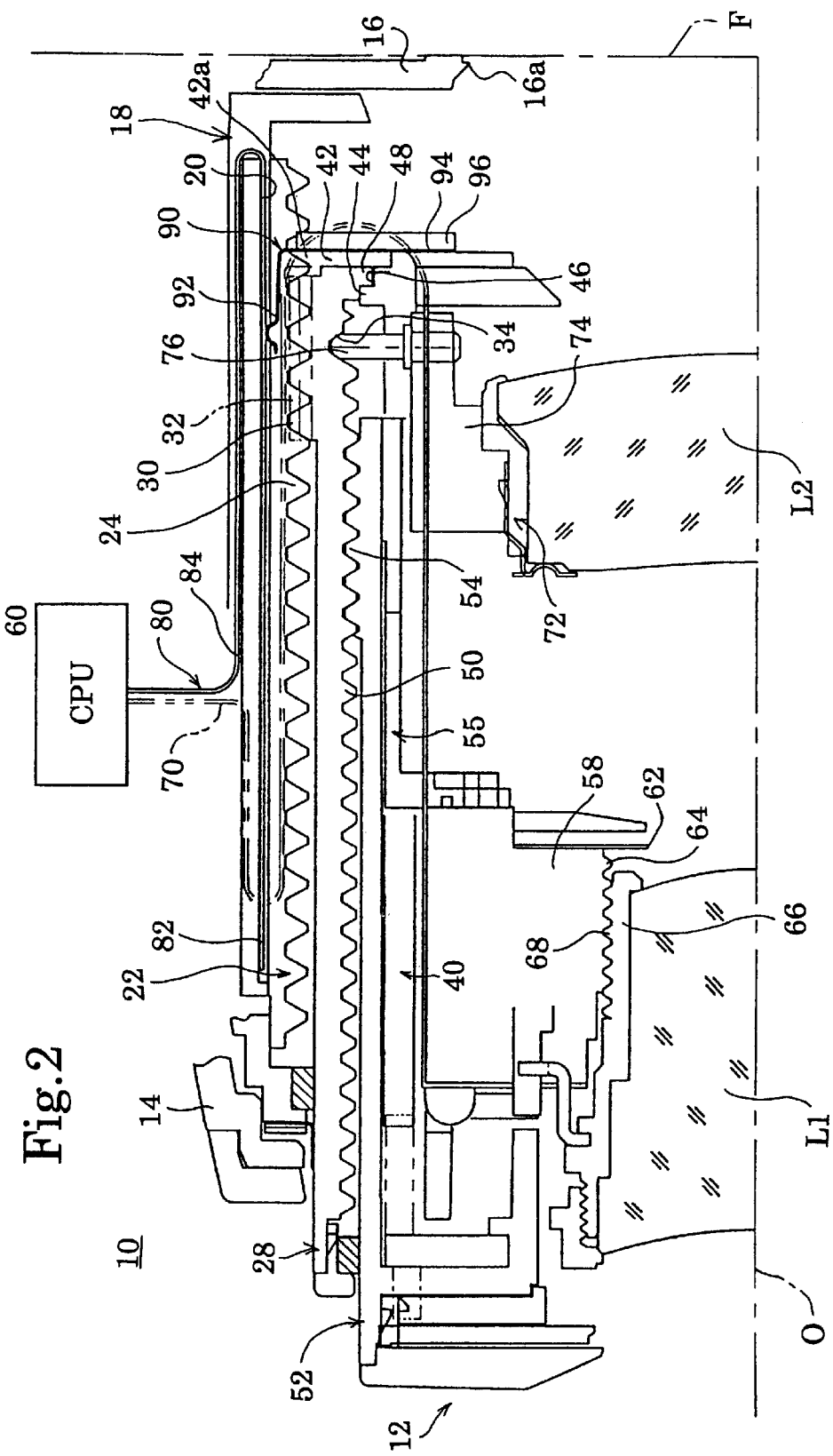
FIG. 2 is a longitudinal sectional view of the upper part of the zoom lens shown in FIG. 1, showing the zoom lens at a wide-angle position.
Figure 3:
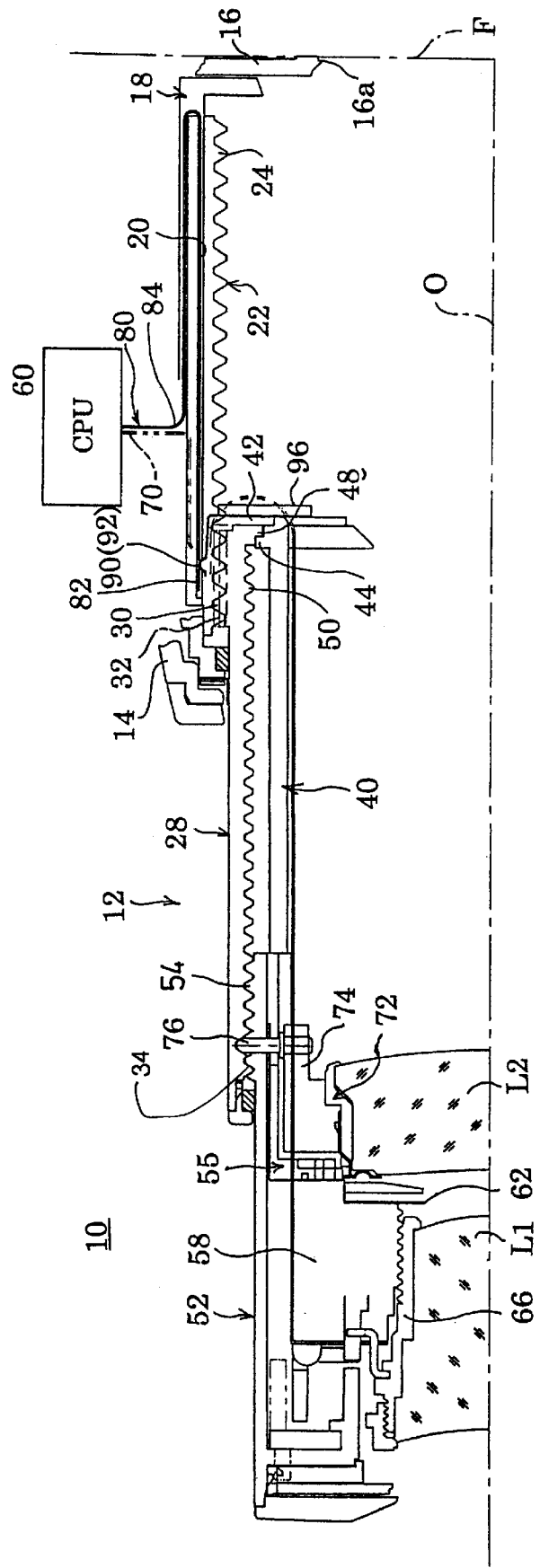
FIG. 3 is a longitudinal sectional view of the upper part of the zoom lens shown in FIG. 1, showing the zoom lens at a telephoto position.
Figure 4:
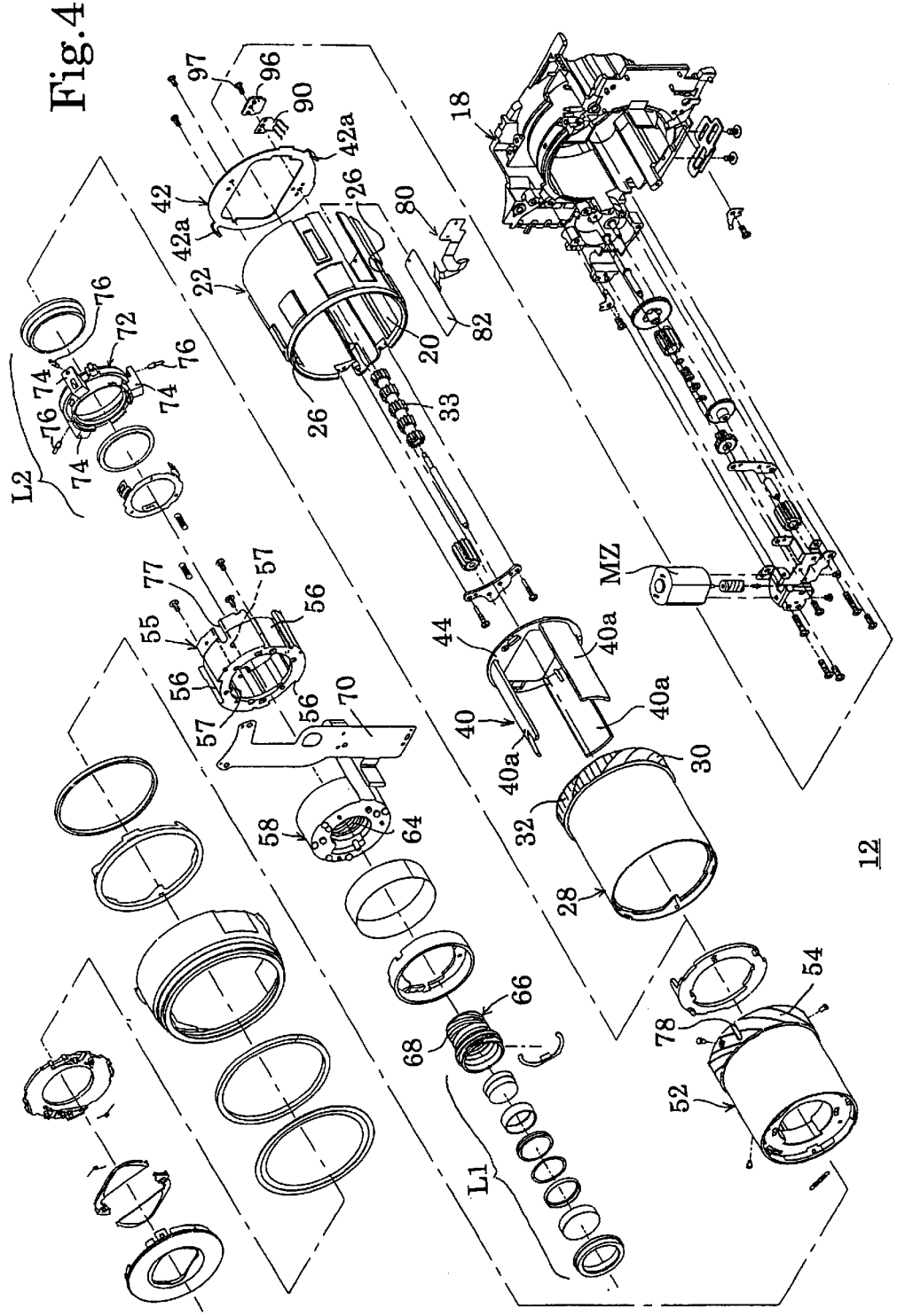
FIG. 4 is an exploded perspective view of the overall structure of the zoom lens shown in FIG. 1.

FIGS. 1 through 3 are longitudinal sectional views of an embodiment of a zoom lens 12 of a camera 10 having a focal length detector according to the present invention, while FIG. 4 is an exploded perspective view of the overall structure of the zoom lens 12. The zoom lens (zoom lens barrel) 12 is a two-stage delivery type (telescoping type) having two extending barrels, namely a rotational moving barrel (outer moving barrel) 28 and a linear moving barrel (inner moving barrel) 52 which are concentrically arranged about an optical axis O. In the zoom lens 12, two lens groups are provided as a photographic optical system, namely a front lens group L1 and a rear lens group L2. The zoom lens 12 performs zooming by changing the distance between the first and second lens groups L1 and L2 and at the same time changing the distance between each of the first and second lens groups L1 and L2 and a film surface F. The zoom lens 12 performs a focusing operation by moving the first lens group L1 along the optical axis O to bring an object into focus. The overall structure and operations of the zoom lens 12 will be hereinafter discussed in detail with reference to FIGS. 1 through 5.

Figure 5:
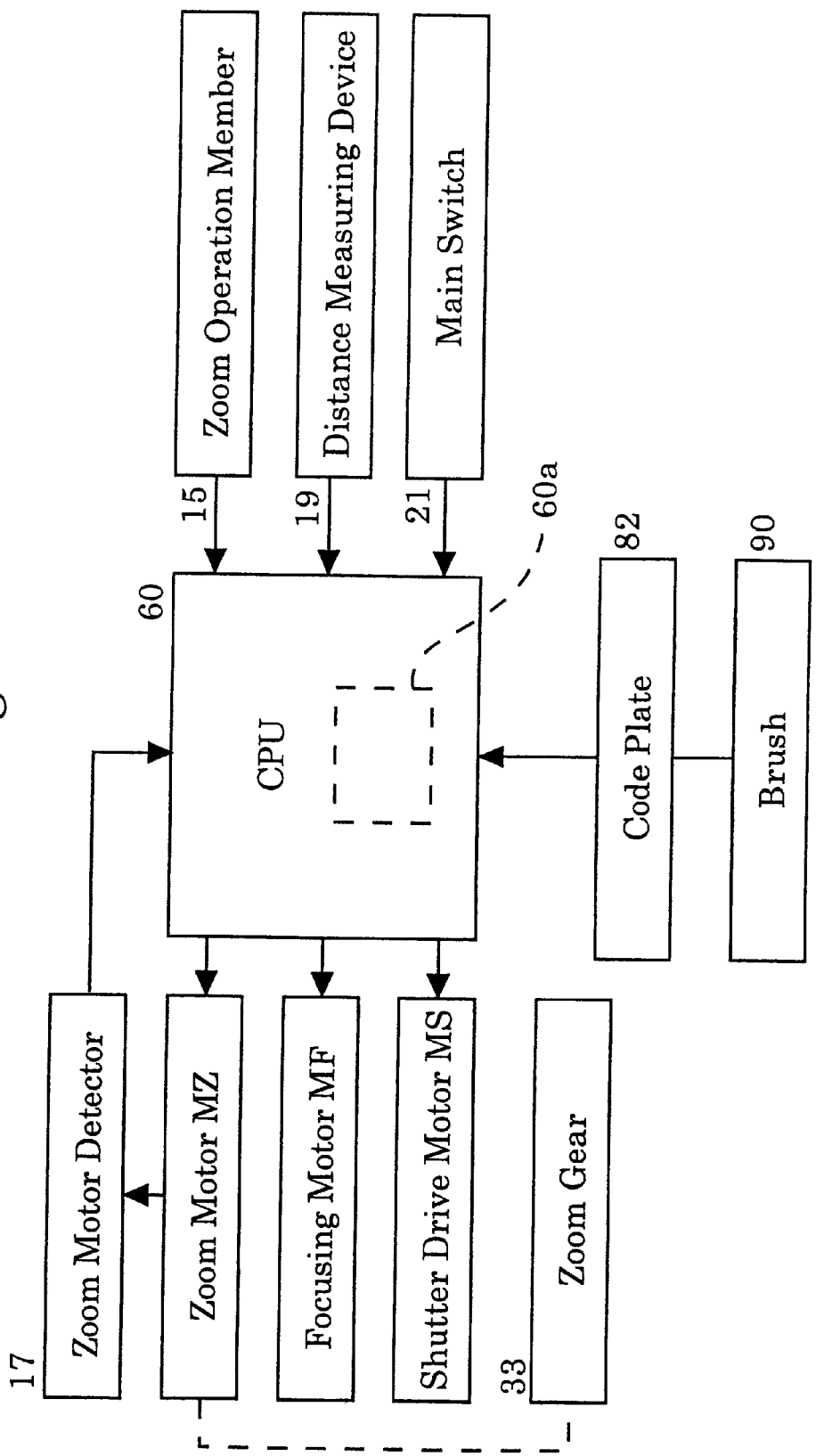
FIG. 5 is a block diagram of a control system of the camera having the zoom lens shown in FIGS. 1 through 4.

FIG. 5 shows a block diagram of a control system of the camera 10 having the zoom lens 12. The camera 10 is provided with a CPU 60 which comprehensively controls the overall operations of the camera 10. The camera 10 is further provided with a zoom motor MZ, a focusing motor MF, a shutter drive motor MS, a zoom operation member (e.g., a zoom lever or knob) 15, a zoom motor detector 17, a distance measuring device 19, a main switch 21, a code plate 82 and a brush 90 which are all electrically connected to the CPU 60. The zoom motor MZ is controlled to change the direction of rotation thereof by the CPU 60 so that the zoom lens 12 is driven to advance or retreat according to an operation of the zoom operation member 15 provided on a camera body 14 of the camera 10. The zoom motor detector 17 detects the direction of driving of the zoom motor MZ (i.e., whether the zoom motor MZ rotates forwardly or reversely), and this detected information on the driving direction of the zoom motor MZ is input to the CPU 60.

The camera body 14 is provided therein with an aperture plate 16 fixed to the camera body 14. The aperture plate 16 is provided at the center thereof with a rectangular-shaped aperture 16a which forms the limits of each frame exposed. A fixed lens barrel block 18 is fixed to the front of the aperture plate 16.

A stationary helicoid barrel 22 is fitted in, and fixed to, a cylindrical portion of the fixed lens barrel block 18. The stationary helicoid barrel 22 is provided, on an inner periphery thereof, with a female helicoid 24, and also two linear guide slots 26 each extending parallel to the optical axis O, i.e., extending in the optical axis direction. The stationary helicoid barrel 22 is provided, on an inner periphery thereof, with a code-plate accommodating groove 20 which extends in the optical axis direction. The code plate 82 which is formed as part of a flexible PWB (printed wiring board) 80 is fixed at the bottom of the longitudinal groove 20. The flexible PWB 80 is bent over at the rear end of the code-plate accommodating groove 20 to be connected to the CPU 60. Part of the flexible PWB 80 which extends from the bent portion to the CPU 60 is formed as a lead portion 84 (see FIG. 6) whose one and the other surfaces are totally covered by an insulating material.

The rotational moving barrel 28 is provided, on an outer periphery of the rotational moving barrel 28 in the vicinity of a rear end thereof, with a male helicoid 30 and an outer peripheral gear 32 which extend along a common circumference of the rotational moving barrel 28. The female helicoid 24 of the stationary helicoid barrel 22 meshes with the male helicoid 30. The teeth of the outer peripheral gear 32 extend in the optical axis direction and meshes with a zoom gear 33. The zoom gear 33 is driven by the zoom motor MZ to give rotational force to the rotational moving barrel 28 via the outer peripheral gear 32. The rotational moving barrel 28 is further provided on an inner periphery thereof with three cam grooves 34 adapted to move the second lens group L2 along the optical axis O in a predetermined manner. Only one of the three cam grooves 34 appears in each of FIGS. 1 through 3.

A linear guide member 40 is positioned in the rotational moving barrel 28. A linear guide plate 42 is fixed at the rear end of the linear guide member 40. The linear guide plate 42 is provided with two guide projections 42a each extending outwardly radially. The two guide projections 42a are respectively engaged with the two linear guide slots 26 of the stationary helicoid barrel 22, so that the linear guide member 40 is guided linearly in the optical axis direction without rotating relative to the fixed lens barrel block 18. The linear guide member 40 is provided, on an outer periphery in the vicinity of the rear end thereof, with a flange 44. The linear guide member 40 is further provided, in the vicinity of the rear end thereof, with an annular groove 46 formed between the flange 44 and the linear guide plate 42. On the other hand, the rotational moving barrel 28 is provided, on an inner periphery of the rear end thereof, with a plurality of engaging projections 48. Only one of the engaging projections 48 appears in each of FIGS. 1 through 3. The engaging projections 48 are fitted in the annular groove 46 of the linear guide member 40 to be slidable therealong without moving in the optical axis direction relative to the annular groove 46. Due to this engagement of the engaging projections 48 with the annular groove 46, the rotational moving barrel 28 can rotate about the optical axis O relative to the linear guide member 40 but cannot move in the optical axis direction relative to the linear guide member 40.

The rotational moving barrel 28 and the linear guide member 40 are fundamental elements of a first extending barrel (first lens barrel) of the zoom lens 12. Regarding this first extending barrel, if the zoom gear 33 is driven by the zoom motor MZ in a direction to advance the first extending barrel, the rotational moving barrel 28 is driven to rotate via the outer peripheral gear 32, so that the rotational moving barrel 28 advances from the fixed lens barrel block 18 in the optical axis direction while rotating due to the engagement of the female helicoid 24 with the male helicoid 30. At the same time, the linear guide member 40, which is supported by the rotational moving barrel 28 therein so that the rotational moving barrel 28 can rotate relative to the linear guide member 40, moves together with the rotational moving barrel 28 in the optical axis direction while being linearly guided by the linear guide slots 26 of the stationary helicoid barrel 22 via the linear guide plate 42.

Figure 6:
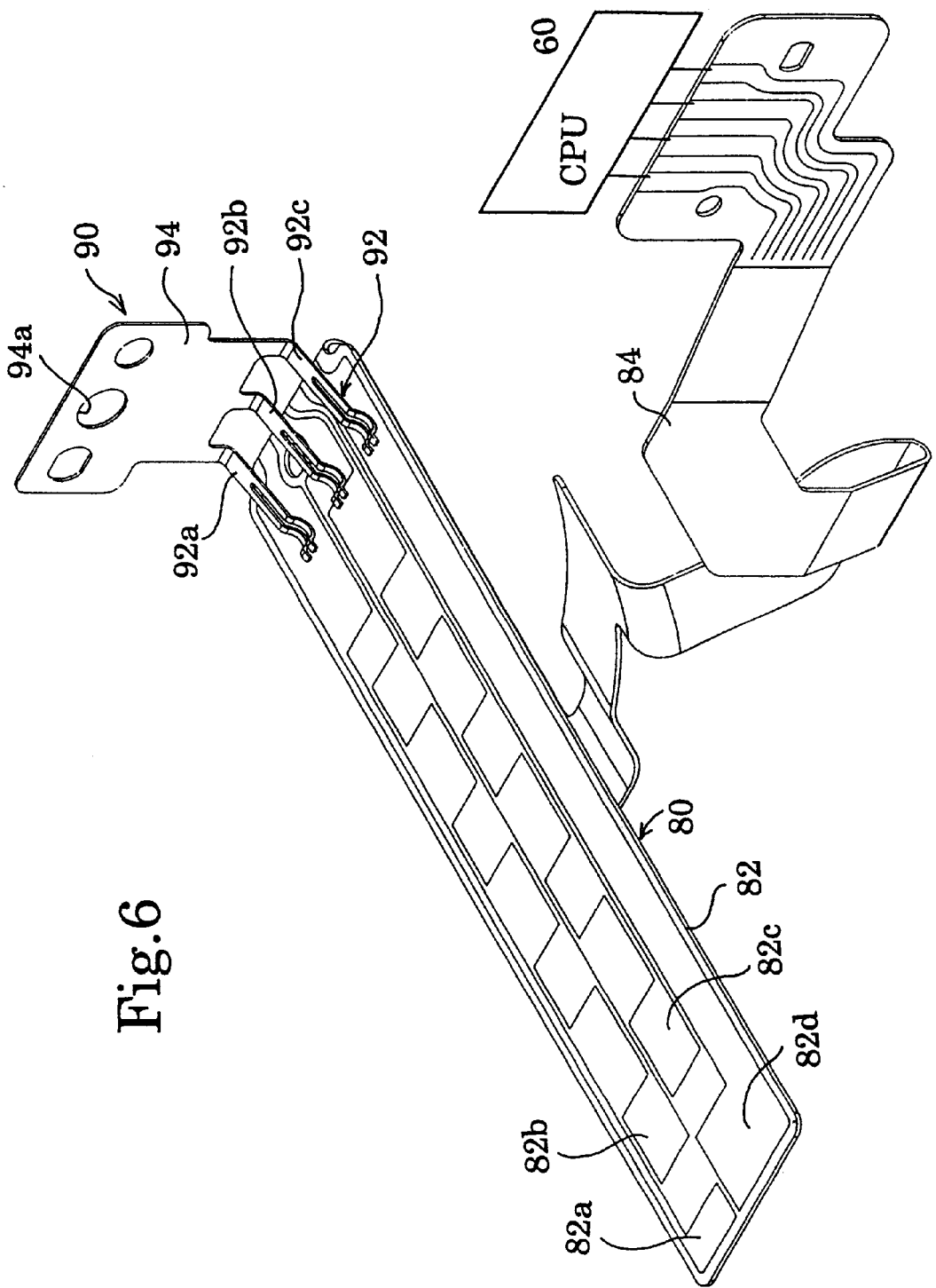
FIG. 6 is a perspective view of a code plate and a brush which are elements of the focal length detector of the camera having the zoom lens shown in FIGS. 1 through 4.

The brush 90 is fixed at the rear end of the first extending barrel of the zoom lens 12, namely, at the rear end of the rotational moving barrel 28 and the linear guide member 40. The code plate 82 of the flexible PWB 80 and the brush 90 are fundamental elements of the focal length detector of the camera 10. The brush 90 is provided with a contacting portion 92 having three sliding contacts (first, second and third contacts) 92a, 92b and 92c which extend forwardly to come into contact with the code plate 82. The brush 90 is further provided with a fixing portion 94 which extends from the contacting portion 92 in a direction substantially perpendicular to the optical axis O. As shown in FIG. 6, the fixing portion 94 of the brush 90 is provided with a circular hole 94a. The fixing portion 94 is held between the linear guide plate 42 and a holding piece 96, while a set screw 97 is screwed into the linear guide plate 42 through the holding piece 96 and the fixing portion 94 to fix the brush 90 to the rear end of the linear guide member 40. With this structure, if the first extending barrel of the zoom lens 12 advances or retreats in the optical axis direction, the brush 90 moves linearly together with the linear guide member 40 in the same direction. This movement of the brush 90 causes the position of the contacting portion 92 relative to the code plate 82 to vary. The focal length of the zoom lens 12 is detected by making use of this variation of the position of the contacting portion 92 relative to the code plate 82. The details of the focal length detector will be discussed later.

The rotational moving barrel 28 is provided on an inner periphery thereof with a female helicoid 50. The linear moving barrel 52 is positioned between the rotational moving barrel 28 and the linear guide member 40 so that a male helicoid 54 formed on an outer periphery of the linear moving barrel 52 meshes with the female helicoid 50 of the rotational moving barrel 28. A first-lens-group holding member 55 is positioned in the linear moving barrel 52 so that the rear end of the first-lens-group holding member 55 is fixed to the rear end of the linear moving barrel 52 by set screws. Therefore, the first-lens-group holding member 55 and the linear moving barrel 52 can move together in the optical axis direction.

As shown in FIG. 4, the first-lens-group holding member 55 is provided on an outer periphery thereof with three linear guide grooves 56 each extending parallel to the optical axis O. On the other hand, the linear guide member 40 is provided with an annular plate having the aforementioned flange 44 along the outer rim of the annular plate, and three guide legs 40a which extend forwardly from the annular plate to be positioned around the optical axis O at regular intervals. The three guide legs 40a are fitted in the three linear guide grooves 56, respectively, to be slidable in the optical axis direction relative to the three linear guide grooves 56. With this slidable engagement of the three guide legs 40a with the three linear guide grooves 56, the firstlens-group holding member 55 and the linear moving barrel 52 are guided in the optical axis direction relative to the linear guide member 40. Accordingly, the linear moving barrel 52 is guided linearly in the optical axis direction relative to the camera body 14 without rotating about the optical axis O.

If the rotational moving barrel 28 advances while rotating, this rotational force is transmitted to the linear moving barrel 52 via the female helicoid 50 and the male helicoid 54 which mesh with each other. At this time, the linear moving barrel 52 does not rotate about the optical axis O relative to the rotational moving barrel 28 while the rotational moving barrel 28 advances while rotating because the linear moving barrel 52 is guided linearly via the linear guide member 40 without rotating about the optical axis O. Therefore, if the rotational moving barrel 28 advances while rotating, the linear moving barrel 52 advances from the rotational moving barrel 28 without rotating relative to the fixed lens barrel block 18 in accordance with the relationship between the female helicoid 50 and the male helicoid 54. Therefore, the linear moving barrel 52 is a fundamental element of a second extending barrel (second lens barrel) of the zoom lens 12.

An AF/AE (i.e., autofocus/auto-exposure) shutter unit or block 58 having a substantially cylindrical shape is fixed to the front end of the first-lens-group holding member 55, which is fixed to the linear moving barrel 52. The AF/AE shutter unit 58 is provided therein with a series of shutter blades 62 (see FIG. 3), and the shutter drive motor MS (see FIG. 5). Returning to FIG. 4, the AF/AE shutter unit 58 controls the shutter drive motor MS to drive the series of shutter blades 62 (see FIG. 3) in accordance with a shutter release signal input from the CPU 60. The AF/AE shutter unit 58 is provided on an inner periphery with a female threaded portion 64. A first lens frame 66 which supports the first lens group L1 therein is fitted in the AF/AE shutter unit 58 from the front thereof so that a male threaded portion 68 formed on an outer periphery of the first lens frame 66 meshes with the female threaded portion 64. The AF/AE shutter unit 58 is provided therein with the focusing motor MF (see FIG. 5). In accordance with the object distance information obtained from the distance measuring device 19 (see FIG. 5) and the focal length information (electrical-connection indication signals or zoom code data) input from the code plate 82, the AF/AE shutter unit 58 controls the focusing motor MF to rotate the first lens frame 66 relative to the AF/AE shutter unit 58 to thereby move the first lens frame 66 (i.e., the first lens group L1) along the optical axis O relative to the AF/AE shutter unit 58 due to the engagement of the male threaded portion 68 with the female threaded portion 64 to bring an object into focus. Accordingly, the first lens group L1 moves together with the linear moving barrel 52 along the optical axis O when the linear moving barrel 52 advances or retreats, while the first lens group L1 is driven by the focusing motor MF to move forwardly and rearwardly relative to the linear moving barrel 52 to bring an object into focus. Drive signals for performing such a focusing operation and the aforementioned shutter drive operation are sent from the CPU 60 to the focusing motor MF and the shutter drive motor MS, respectively, via a flexible PWB 70 (see FIG. 4) used for the AF/AE shutter unit 58.

The second lens group L2 is supported by a second lens frame 72. The second lens frame 72 is provided with three guide projections 74 each extending outwardly and radially. A guide pin 76 is fixed at the tip of each guide projection 74. On the other hand, the first-lens-group holding member 55 is provided on an inner periphery thereof with three linear guide grooves 57 which extend parallel to the optical axis O so that the linear guide grooves 57 and the aforementioned linear guide grooves 56 are formed at different circumferential positions on the inner periphery of the first-lens-group holding member 55. Only two of the three linear guide grooves 57 are shown in FIG. 4. The three guide projections 74 are slidably fitted in the three linear guide grooves 57 of the first-lens-group holding member 55, respectively. Since the first-lens-group holding member 55 is guided linearly without rotating about the optical axis O by the linear guide member 40 as mentioned above, the second lens frame 72, which is guided by the linear guide grooves 57 of the first-lens-group holding member 55, is also guided linearly without rotating about the optical axis O.

The three guide pins 76, which respectively extend from the three guide projections 74 of the second lens frame 72, pass through three slots 77 formed on the first-lens-group holding member 55 and also three slots 78 formed on the linear moving barrel 52 so that the tips of the three guide pins 76 are fitted in the three cam grooves 34 of the rotational moving barrel 28, respectively. Each of the three slots 77 and the three slots 78 extends parallel to the optical axis O. The second lens frame 72, provided with the guide pins 76, can move in the optical axis direction relative to the first-lens-group holding member 55 and the linear moving barrel 52 by movement of the guide pins 76 along the slots 77 and 78 therein. The cam grooves 34 are formed having a predetermined contour which is inclined to the optical axis O. If the rotational moving barrel 28 is driven to rotate by the zoom motor MZ, the second lens group L2 (the second lens frame 72), which is linearly guided without rotating via the linear guide member 40 and the first-lens-group holding member 55, moves along the optical axis O in a predetermined manner in accordance with the contour of the cam grooves 34.

The operation of the zoom lens 12 will be hereinafter discussed. If the zoom motor MZ is actuated to rotate in a forward direction of advancing the zoom lens 12 from a housed position (retracted position) thereof shown in FIG. 1 or a wide-angle extremity thereof shown in FIG. 2, the rotational moving barrel 28 advances from the stationary helicoid barrel 22 while rotating about the optical axis O. At the same time, the linear guide member 40 advances together with the rotational moving barrel 28 while being guided linearly without rotating by the linear guide slots 26 of the stationary helicoid barrel 22. Advancing movement of the rotational moving barrel 28 while the rotational moving barrel 28 is rotating causes the second lens greoup L2 to move forwards within the first extending barrel due to the engagement of the cam grooves 34 with the guide pins 76. At the same time, the linear moving barrel 52 and the first-lens-group holding member 55, which are guided linearly without rotating by the linear guide member 40, advance via the rotation of the rotational moving barrel 28, so that the first lens group L1 advances together with the linear moving barrel 52.

If the zoom motor MZ is actuated to rotate in a reverse direction of retracting the zoom lens 12 from a telephoto position thereof shown in FIG. 3, the zoom lens 12 is driven in a reverse manner. Namely, the linear moving barrel 52 moves in a direction to retreat into the first extending barrel (the rotational moving barrel 28 and the linear guide member 40), while the first extending barrel moves in a direction to retreat into the camera body 14. Accordingly, the zoom lens 12, provided with the first and second extending barrels, varies the focal length thereof by a combination of the variation of the distance between the first and second lens groups L1 and L2, and the variation of the distance between each of the first and second lens groups L1 and L2 and the film surface F. This focal length variation is detected by making use of the variation of the position of the contacting portion 92 of the brush 90 (which is fixed to the linear guide member 40 that moves in the optical axis direction relative to the stationary helicoid barrel 22) relative to the code plate 82 (which is supported by the stationary helicoid barrel 22). A focusing operation is carried out at any set focal length by driving the first lens group L1 along the optical axis O by the focusing motor MF provided in the AF/AE shutter unit 58.

In the present embodiment, the zoom lens 12 is at the housed position shown in FIG. 1 when the main switch 21 of the camera 10 is OFF. Immediately after the main switch 21 is turned ON, the zoom lens 12 is extended from the housed position to the wide-angle extremity shown in FIG. 2 to be in a photo-ready state. When the zoom lens 12 is at any position between the wide-angle extremity and the telephoto extremity, the zoom lens 12 can be driven to advance or retreat freely by operating the zoom operation member 15.

The focal length detector of the zoom lens 12 will be hereinafter discussed in detail with reference to FIGS. 6 and 7. FIG. 6 is a perspective view of the code plate 82 and the brush 90, while FIG. 7 is an explanatory view of the code plate 82 and the brush 90, showing combinations of code patterns (82a, 82b and 82c) electrically connected to or disconnected from a ground pattern (82d).

The flexible PWB 80 is provided with the code plate 82 and the lead portion 84 as mentioned above. The code plate 82 is fixed at the bottom of the longitudinal groove 20 of the stationary helicoid barrel 22 therealong so that the longitudinal direction of the code plate 82 extends in the optical axis direction. The lead portion 84 connects the code plate 82 to the CPU 60. Although the lead portion 84 is totally covered by an insulating material, the code plate 82 is not covered by the insulating material so as to expose conductive lands or terminals formed thereon. In FIG. 7, hatched portions represent the conductive lands formed on the code plate 82. The code plate 82 is provided thereon with four conductive patterns, i.e., first, second and third code patterns (conductive code patterns or terminals) 82a, 82b and 82c and a ground (ground pattern) 82d. These patterns 82a through 82d are formed on the code plate 82 to be insulated from one another. Each of the patterns 82a through 82d is connected to a focal-length detecting circuit 60a provided in the CPU 60 via a corresponding printed lead wire formed in the lead portion 84.

The brush 90 is made of a conductive material such as a conductive metal plate and is shaped by press forming. The brush 90 is provided with the contacting portion 92, which extend forwardly to come in contact with the code plate 82, and the fixing portion 94, which extends from the contacting portion 92 used to fix the brush 90 to the linear guide plate 42, that is formed integral with the linear guide member 40. The contacting portion 92 of the brush 90 extends so that the tips of the three sliding contacts 92a, 92b and 92c come into contact with that surface of the code plate 82 on which the code patterns 82a through 82d are formed. The three sliding contacts 92a, 92b and 92c of the contacting portion 92 slide on the code plate 82 in the optical axis direction (in the right/left direction as viewed in FIG. 7) when the zoom lens 12 advances or retreats. A combination of the code patterns 82a, 82b and 82c electrically connected to, or disconnected from, the ground pattern 82d varies depending upon the position of the brush 90 relative to the code plate 82, so that the focal length of the zoom lens 12 is detected by detecting the combination of the code patterns 82a, 82b and 82c electrically connected to or disconnected from the ground pattern 82d.

Figure 7:
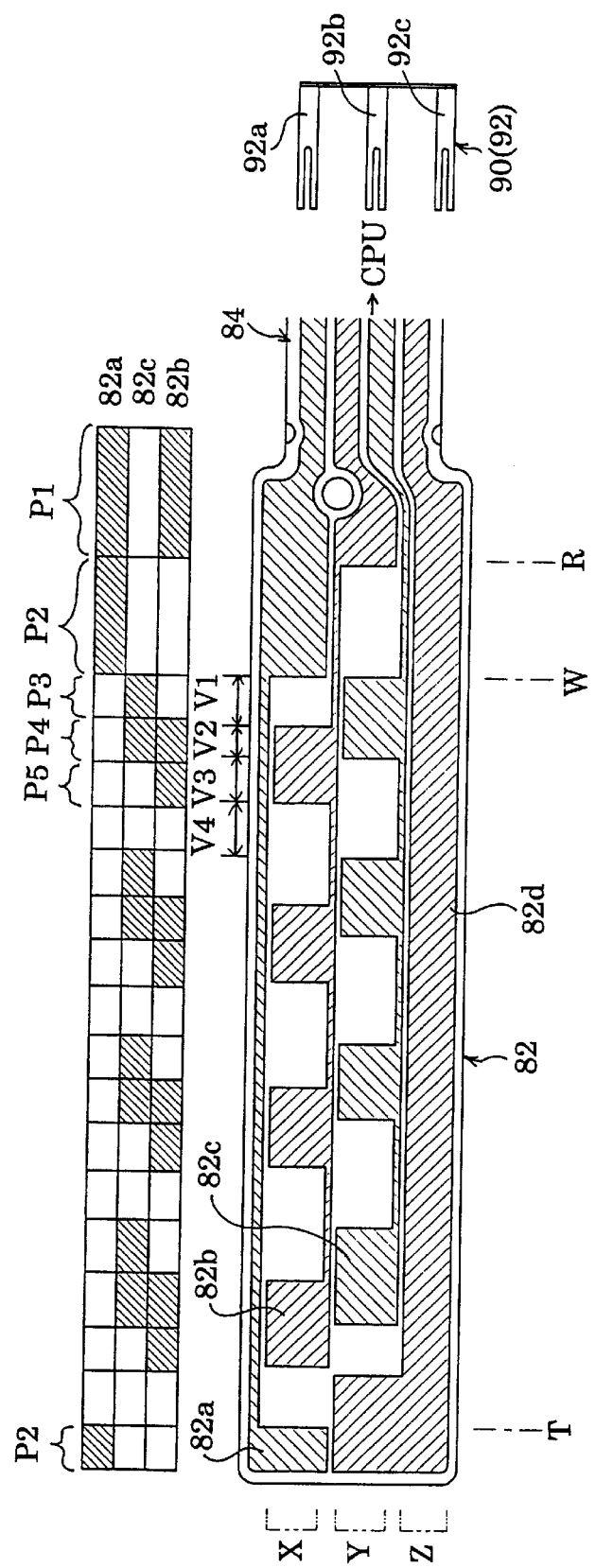
FIG. 7 is an explanatory view of the code plate and the brush shown in FIG. 6, showing combinations of code patterns electrically connected to or disconnected from a ground pattern.

In the illustrated embodiment of the focal length detector, the brush 90 is provided with three sliding contacts (92a, 92b and 92c), so that the code plate 82 is provided along the longitudinal direction thereof with corresponding three contacting portions (first, second and third contacting portions) X, Y and Z as shown in FIG. 7. On the third contacting portion Z, with which the sliding contact 92c of the brush 90 is always in contact, the ground pattern 82d is formed along the longitudinal direction of the code plate 82. None of the remaining code patterns 82a, 82b and 82c are formed on the contacting portion Z.

On the first contacting portion X which is formed to correspond to the first sliding contact 92a of the brush 90, a plurality of lands (conductive lands) are formed. Likewise, on the second contacting portion Y which is formed to correspond to the second sliding contact 92b of the brush 90, a plurality of conductive lands are formed. More specifically, as shown in FIG. 7, the first contacting portion X is provided thereon at each of the opposite ends thereof with a land of the first code pattern 82a, and is provided thereon between the two lands of the first code pattern 82a with four lands of the second code pattern 82b arranged at predetermined intervals. The second contacting portion Y is provided thereon, at the rear end thereof on the side of the lead portion 84 (the right end as viewed in FIG. 7), with a land of the second code pattern 82b, and is further provided thereon, at the front end thereof (the left end as viewed in FIG. 7), with a land of the ground pattern 82d. The second contacting portion Y is further provided, thereon between the land of the second code pattern 82b and the land of the ground pattern 82d, with four lands of the third code pattern 82c arranged at predetermined intervals.

In the illustrated embodiment of the code plate 82, the second and third code patterns 82b and 82c are formed as repetitive-pattern detecting terminals to obtain two-bit repetitive codes for detecting intermediate focal lengths between the wide-angle extremity and the telephoto extremity, whereas the first code pattern 82a is formed as a key code terminal (specific-code detecting terminal) for detecting specific positions such as the housed position, the wide-angle extremity and the telephoto extremity.

Regarding the second and third code patterns 82b and 82c for detecting intermediate focal lengths between the wide-angle extremity and the telephoto extremity, the series of lands of the second code pattern 82b and the series of lands of the third code pattern 82c are formed to be displaced from each other in the longitudinal direction of the code plate 82 in the following manner. Namely, when the brush 90 moves in a direction from the wide-angle extremity to the telephoto extremity (from right to left as viewed in FIG. 7), firstly, only the third code pattern 82c contacts with the second sliding contact 92b in a first section V1; secondly the second and third code patterns 82b and 82c contact with the first and second sliding contacts 92a and 92b, respectively, in a second section V2; and thirdly only the second code pattern 82b contacts with the first sliding contact 92a in a third section V3, except for the ground pattern 82d to which the third sliding contact 92c of the brush 90 is always in contact. Thereafter, i.e., fourthly, neither the second code pattern 82b nor the third code patterns 82c contacts with the first sliding contact 92a or the second sliding contact 92b, respectively, in a fourth section (non-conductive section) V4. In FIG. 7, although only one set of sections V1, V2, V3 and V4 is shown on the side of the wide-angle extremity, the code plate 82 is provided with repeated four sets of sections V1, V2, V3 and V4 in total between the wide-angle extremity and the telephoto extremity, as can be clearly seen in FIG. 7.

When the sliding contacts 92a, 92b and 92c of the brush 90 are positioned to contact with the code plate 82 in a section between "W" (wide-angle) position and "R" (retracted) position, the first code pattern 82a (i.e., the specific-code detecting terminal), which has no relationship with the aforementioned two-bit repetitive codes, contacts with the first sliding contact 92a of the brush 90 in addition to the ground pattern 82d which remains contact with the third sliding contact 92c of the brush 90. Likewise, when the sliding contacts 92a, 92b and 92c of the brush 90 are positioned to contact with the code plate 82 at "T" (telephoto) position, the first code pattern 82a (i.e., the specific-code detecting terminal), which has no relationship with the aforementioned two-bit repetitive codes, contacts with the first sliding contact 92a of the brush 90 in addition to the ground pattern 82d which is always in contact with the third sliding contact 92c of the brush 90. For instance, at each of the positions "W" and "T" shown in FIG. 7 which correspond to the wide-angle extremity of the zoom lens 12 shown in FIG. 2 and the telephoto extremity of the zoom lens 12 shown in FIG. 3, respectively, the first sliding contact 92a of the brush 90 comes into contact with the first code pattern 82a to thereby electrically connect the first code pattern 82a and the ground pattern 82d via the brush 90 when the zoom lens 12 is driven to be housed in the camera body 14 or to advance from the camera body 14. At the position "R" shown in FIG. 7 which corresponds to the retracted or housed position of the zoom lens 12 shown in FIG. 1, the second sliding contact 92b of the brush 90 comes into contact with the second code pattern 82b in addition to the first sliding contact 92a of the brush 90 contacting with the first code pattern 82a.

Accordingly, whether the zoom lens 12 is positioned at the housed position or either the wide-angle extremity or the telephoto extremity is determined by detecting whether the second code pattern 82b contacts with the second sliding contact 92b of the brush 90.

On the other hand, the second code pattern 82b is formed so as to detect the aforementioned two-bit repetitive codes in connection with the third code pattern 82c, so that the second code pattern 82b needs to be brought into contact with the first sliding contact 92a of the brush 90 when detecting the two-bit repetitive codes. Therefore, in the present embodiment of the focal length detector, the first code pattern 82a is formed only on the first contacting portion X formed to correspond to the first sliding contact 92a, and the third code pattern 82c is formed only on the second contacting portion Y formed to correspond to the second sliding contact 92b. The second code pattern 82b, however, is formed to extend over the first and second contacting portions X and Y, more specifically, over the first contacting portion X in a range which relates to the two-bit repetitive codes between the positions "T" and "W", and the second contacting portion Y in another range which relates to the detection of the housed position of the zoom lens 12.

According to the illustrated embodiment of the focal length detector having the above described structure, it is understood from the foregoing that the housed position, the wide-angle extremity, the telephoto extremity and intermediate positions (different focal-length positions) between the wide-angle extremity and the telephoto extremity can be detected with the use of the brush 90 having only three sliding contacts (92a, 92b and 92c). The manner of detecting these positions will be further discussed in detail with reference to FIG. 7. In FIG. 7, although a diagram showing combinations of the code patterns 82a, 82b and 82c electrically-connected to or disconnected from the ground pattern 82d is illustrated, above the plan view of the code plate 82, in connection with the code plate 82, an array of hatched/non-hatched squares corresponding to the second code pattern 82b and an array of hatched/non-hatched squares corresponding to the third code pattern 82c are reversely shown in the diagram as compared with the actual code plate 82. In the description hereinbelow, it is assumed that the third sliding contact 92c of the brush 90 is always in contact with the ground 82d. In the diagram shown in FIG. 7, each hatched square represents the land of the corresponding conductive pattern 82a, 82b or 82c which is electrically connected to the ground pattern 82d via the brush 90, while each non-hatched square (white square) represents the land of the corresponding conductive pattern 82a, 82b or 82c which is electrically disconnected from the ground pattern 82d.

In a state where the zoom lens 12 is at the housed position shown in FIG. 1, the first through third sliding contacts 92a, 92b and 92c of the brush 90 contact with the code plate 82 at the position "R" shown in FIG. 7 due to the positional relationship between the stationary helicoid barrel 22 and the linear guide member 40. At the position "R", the first sliding contact 92a and the second sliding contact 92b are in contact with the first code pattern 82a and the second code pattern 82b, respectively, so that each of the first and second code patterns 82a and 82b is electrically connected to the ground pattern 82d via the brush 90 to thereby obtain a first electrical-connection indication signal (zoom code data) P1. The CPU 60 determines that the zoom lens 12 is at the housed position upon receiving the first electrical-connection indication signal P1 obtained at the position "R".

If the zoom lens 12 is driven to advance forwardly from the housed position towards the wide-angle extremity as shown in FIG. 2, the linear guide member 40 advances relative to the stationary helicoid barrel 22 and at the same time the brush 90 advances relative to the code plate 82 in a direction from right to left as viewed in FIG. 7. If the brush 90 moves left as viewed in FIG. 7 from a position where the first electrical-connection indication signal P1 is obtained, the first sliding contact 92a keeps contacting with the first code pattern 82a but the second sliding contact 92b does not contact with any code pattern, so that only the first contact 82a of the brush 90 is electrically connected with the ground pattern 82d to thereby obtain a second electrical-connection indication signal P2. This state where the second electrical-connection indication signal P2 is obtained continues while the brush 90 is moving left as viewed in FIG. 7 from the position where the first electrical-connection indication signal P1 is obtained before the contacting portion 92 (92a, 92b and 92c) reaches the position "W" on the code plate 82. Once the contacting portion 92 of the brush 90 reaches the position "W", a state where the second electrical-connection indication signal P2 is obtained shifts to another state where the first sliding contact 92a does not contact with either the first or second code pattern 82a or 82b while the second sliding contact 92b contacts with the third code pattern 82c to thereby obtain a third electrical-connection indication signal P3. The CPU 60 determines that the zoom lens 12 has advanced to the wide-angle extremity upon detecting the transitional point of reception of the second and third electrical-connection indication signals P2 and P3.

If the zoom lens 12 is driven to advance from the wide-angle extremity, the contacting portion 92 of the brush 90 relative to the code plate 82 moves left as viewed in FIG. 7 from the position "W". According to this movement, a state where the third electrical-connection indication signal P3 continues as long as the contacting portion 92 of the brush 90 is in the first section V1 shown in FIG. 7. Subsequently, once the contacting portion 92 of the brush 90 reaches the second section V2 shown in FIG. 7, the second and third code patterns 82b and 82c are electrically connected to the ground pattern 82d via the first and second sliding contacts 92a and 92b of the brush 90, respectively, to obtain a fourth electrical-connection indication signal P4. Subsequently, once the contacting portion 92 of the brush 90 reaches the third section V3 shown in FIG. 7, only the second code pattern 82b is electrically connected to the ground pattern 82d via the first sliding contact 92a of the brush 90 to obtain a fifth electrical-connection indication signal P5. Subsequently, after the fifth electrical-connect ion indication signal P5 is detected by the CPU 60, if the contacting position 92 of the brush 90 moves to the fourth section V4 shown in FIG. 7, only the third sliding contact 92c of the brush 90 contacts with the ground pattern 82d but neither the first sliding contact 92a nor the second sliding contact 92b contacts with any code pattern, so that all the three code patterns 82a, 82b and 83c are electrically disconnected from the ground pattern 82d. In accordance with the advancing movement of the zoom lens 12 from the wide-angle extremity to the telephoto extremity, the third, fourth and fifth electrical-connection indication signals are repeatedly detected four times. Namely, if the transitional points of reception of the signals P1 through P4 are considered as the detectable number of the focal lengths, sixteen different intermediate focal lengths can be detected between the wide-angle extremity and the telephoto extremity with repeatedly-detectable conductive lands of the second and third code patterns 82b and 82c. In order to precisely determine which of the conductive lands of the code patterns corresponds to which intermediate focal length, for instance, the CPU has only to count the number of reference signals or codes with one of the third, fourth and fifth electrical-connection indication signals P3, P4 and P5 being regarded as a reference signal or code.

If the zoom lens 12 is fully extended to the telephoto extremity as shown in FIG. 3, the linear guide member 40 is positioned at the frontmost position thereof relative to the stationary helicoid barrel 22 and at the same time the contacting portion 92 of the brush 90 contacts with the code plate 82 at the position "T" shown in FIG. 7. At the position "T", the first sliding contact 92a is in contact with the first code pattern 82a while the second sliding contact 92b together with the third sliding contact 92c is in contact with the ground pattern 82d, so that the aforementioned second electrical-connection indication signal P2 is detected. The second electrical-connection indication signal P2 is used as a code to detect the wide-angle extremity at the time of retracting the zoom lens 12 and also as a code to detect the telephoto extremity at the time of advancing the zoom lens 12. The CPU 60 detects the direction of driving of the zoom motor MZ via the zoom motor detector 17 at the time of detection of the focal length of the zoom lens 12, so that it can be determined whether the detected second electrical-connection indication signal P2 corresponds to the wide-angle extremity or the telephoto extremity by referring to the direction of driving of the zoom motor MZ. In this case, the CPU 60 functions as a position detecting device. For instance, it is determined that the zoom lens 12 is at the telephoto extremity if the detected second electrical-connection indication signal P2 is detected during the time the zoom motor MZ is driven in a direction to advance the zoom lens 12, while it is determined that the zoom lens 12 is at the wide-angle extremity if the detected second electrical-connection indication signal P2 is detected during the time the zoom motor MZ is driven in a direction to retreat the zoom lens 12. Accordingly, the CPU 60 functions as a device for determining whether the zoom lens is at a first focal length position (the telephoto extremity) or a second focal length position (the wide-angle extremity) by referring to the direction of driving of the zoom motor MZ when a common signal (the second electrical-connection indication signal P2) generated when the zoom lens 12 is at the first focal length position or the second focal length position is detected.

Similar operations are carried out to detect the focal length of the zoom lens 12 when the zoom motor MZ is driven in a direction to retreat the zoom lens 12. Although the details thereof will not herein be discussed so as to prevent redundant explanations, the CPU 60 can detect each focal length from the telephoto extremity to the wide-angle extremity in accordance with the five electrical-connection indication signals P1 through P5 when the linear guide member 40 retreats relative to the fixed lens barrel block 18. As mentioned above, although it is determined that the zoom lens 12 is at the wide-angle extremity if the detected second electrical-connection indication signal P2 is detected when the zoom lens 12 is being driven in a direction to retreat the zoom lens 12, it can be determined that the zoom lens 12 is at the wide-angle extremity by referring to the direction of driving of the zoom motor MZ.

As can be understood from the foregoing, according to the focal length detector of the camera 10 having the zoom lens 12, all the focal lengths can be detected with the brush 90 having only three sliding contacts (92a, 92b and 92c) relative to the four patterns 82a through 82d (including the ground pattern 82d) on the code plate 82. According to this structure, since the brush 90 is provided with only three sliding contacts, the width of the brush 90 in a direction perpendicular to the direction of relative movement between the brush 90 and the code plate 82 can be made small, which is advantageous to miniaturize the camera 10. In general, the width of the code plate is subject to the width of the corresponding brush or the number of sliding contacts, so that the width of the code plate can be made small according to the focal length detector to which the present invention is applied.

The focal length detector according to the present invention is not limited solely to the particular embodiment herein disclosed. For instance, in the case of utilizing a pair of sliding contacts of the brush (except for a specific sliding contact which is always in contact with a ground pattern of the code plate) and three code patterns of the code plate, the number of combinations of the code patterns electrically-connected to or disconnected from the ground pattern via the brush is six at maximum, so that it is possible to use three of the six combinations as repetitive codes and the remaining three combinations as codes to detect the wide-angle extremity, the telephoto extremity and the housed position of the zoom lens, respectively. In other words, in the illustrated embodiment, although a combination of the first code pattern 82a and the third code pattern 82c which are electrically-connected with the ground pattern 82d via the brush 90 is not utilized, such a combination can be utilized as a specific code to detect either the wide-angle extremity or the telephoto extremity of the zoom lens 12. In this case, it is not necessary to refer to the direction of driving of the zoom motor MZ to determine whether the zoom lens is at the wide-angle extremity or the telephoto extremity. In another application, although the second code pattern 82b comes into contact with the second sliding contact 92b of the brush 90 when the zoom lens 12 is at the housed position in the illustrated embodiment, it is possible to detect that the zoom lens 12 is at the housed position by a combination of the first code pattern 82a and the third code pattern 82c which are electrically-connected with the ground pattern 82d via the brush 90 by making the third code pattern 82c come into contact with the second sliding contact 92b of the brush 90 instead of the second code pattern 82b. In this application, since the second code pattern 82b has no relationship with the detection of the housed position of the zoom lens 12, part of the second code pattern 82b does not have to be formed on the second contacting portion Y, so that the second code pattern 82b has only to be formed on the first contacting portion X, which is formed to correspond to the first sliding contact 92a of the brush 90.

Regarding the structure for supporting the code plate and the brush, although the code plate and the brush are moved relative to each other in the optical axis direction in the illustrated embodiment, the present invention is not limited solely to this particular embodiment. The present invention can be applied to another type of focal length detector in which the code plate and the brush are rotated relative to each other about the optical axis of the zoom lens.

As can be understood from the foregoing, according to the present invention, a focal length detector is obtained which is designed small while ensuring the necessary number of codes so as to be advantageously used to facilitate miniaturization of a camera having a zoom lens.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A focal length detector of a camera having a zoom lens, said focal length detector having a code plate and a brush which contacts with said code plate, said code plate and said brush being moved relative to each other according to a variation of the focal length of said zoom lens, said focal length detector having a focal-length detecting circuit;

wherein said brush comprises three sliding contacts which are electrically connected to one another;

wherein said code plate comprises three code patterns and a ground pattern which are insulated from one another, said three code patterns and said ground pattern being electrically connected to said focal-length detecting circuit, wherein said ground pattern remains in contact with a specific sliding contact of said three sliding contacts regardless of the relative position of said code plate and said brush, wherein said three code patterns come into contact with the remaining two of said three sliding contacts in predetermined combinations when said code plate and said brush are moved relative to each other, wherein two of said three code patterns are formed as repetitive-pattern detecting terminals for detecting intermediate focal lengths between a wide-angle extremity and a telephoto extremity of said zoom lens, the two repetitive-pattern detecting terminals having code patterns that, in combination with a remaining two of said three sliding contacts, generate non-unique codes for detecting relative focal length movement of said zoom lens, and wherein a remaining one of said three code patterns is formed as a specific-code detecting terminal for detecting specific focal length positions of said zoom lens.

2. The focal length detector according to claim 1, wherein two of said three code patterns are formed on two contacting portions which are defined on said code plate to correspond to said remaining two of said three sliding contacts, respectively, and wherein the remaining one of said three code patterns are formed to extend over said two contacting portions.

3. The focal length detector according to claim 1, wherein said specific-code detecting terminal is electrically connected to said ground pattern via said brush when said zoom lens is at each of said wide-angle extremity and said telephoto extremity, and wherein one of said two repetitive-pattern detecting terminals and said specific-code detecting terminal are electrically connected to said ground pattern via said brush when said zoom lens is at a housed position behind said wide-angle extremity.

4. The focal length detector according to claim 3, wherein said one of said two repetitive-pattern detecting terminals, which is electrically connected with said ground pattern together with said specific-code detecting terminal when said zoom lens is at said housed position, is formed to extend over two contacting portions which are defined on said code plate to correspond to said remaining two of said three sliding contacts, respectively, and wherein said specific-code detecting terminal and the other of said two repetitive-pattern detecting terminals are formed on said two contacting portions, respectively.

5. The focal length detector according to claim 1, further comprising:

a zoom motor which is controlled to rotate forwardly and reversely to drive said zoom lens to vary said focal length;

a zoom motor detector which detects a direction of driving of said zoom motor; and a position detecting device for determining whether said zoom lens is at one of a first focal length position and a second focal length position by referring to said direction of driving of said zoom motor when a common signal generated when said zoom lens is at one of said first focal length position and said second focal length position is detected via said three code patterns and said ground pattern.

6. The focal length detector according to claim 5, wherein said common signal is detected at each of a wide-angle extremity and a telephoto extremity.

7. The focal length detector according to claim 1, wherein said code plate and said brush are fixed to first and second lens barrels of said zoom lens, respectively, and wherein one of said first and second lens barrels moves relative to the other.

8. The focal length detector according to claim 1, wherein said code plate is formed as part of a flexible PWB.

9. The focal length detector according to claim 1, wherein said code plate is fixed at a bottom of a groove formed on an inner periphery of a lens barrel of said zoom lens.

10. The focal length detector according to claim 9, wherein said groove extends in a direction parallel to an optical axis of said zoom lens.

11. The focal length detector according to claim 1, wherein two of said three code patterns, in combination with said remaining two of said three sliding contacts, generating two-bit predetermined combinations over the range of focal length detection of the brush, and a remaining one of said three code patterns, in combination with a predetermined one of said remaining sliding contacts, generating one-bit predetermined combinations, independent of said two-bit predetermined combinations, over the range of focal length detection of the brush.

12. A camera comprising:

a zoom lens; and a focal length detector which detects focal lengths of said zoom lens, said focal length detector comprising a code plate and a brush which slidably contacts with said code plate, said code plate and said brush being moved relative to each other according to a variation of said focal length of said zoom lens;

wherein said brush comprises at least three sliding contacts which are electrically connected to one another;

wherein said code plate comprises at least four code patterns which are insulated from one another, wherein one of said at least four pattern remains in contact with a specific sliding contact of said at least three sliding contacts regardless of the relative position of said code plate and said brush, wherein two of said four code patterns are formed as two repetitive-pattern detecting terminals for detecting intermediate focal lengths between a wide-angle extremity and a telephoto extremity of said zoom lens, the two repetitive-pattern detecting terminals having code patterns that, in combination with a remaining two of said four sliding contacts, generate non-unique codes for detecting relative focal length movement of said zoom lens, and wherein a remaining one of said four code patterns is formed as a specific-code detecting terminal for detecting specific focal length positions of said zoom lens.

13. The camera according to claim 12, wherein said zoom lens comprises a moving barrel which advances from a camera body when said zoom lens is driven to effect zooming, said brush being fixed to said moving barrel so as to move relative to said code pattern when said zoom lens is driven to effect zooming.

14. The camera according to claim 12, wherein said two of said four code patterns, in combination with said remaining two of said four sliding contacts, generating two-bit predetermined combinations over the range of focal length detection of the brush, and a remaining one of said four code patterns, in combination with a predetermined one of said remaining sliding contacts, generating one-bit predetermined combinations, independent of said two-bit predetermined combinations, over the range of focal length detection of the brush.

15. A focal length detector of a camera having a zoom lens, said focal length detector comprising:

a brush having three sliding contacts which are electrically connected to one another;

a code plate having three code patterns and a ground pattern which are insulated from one another;

said brush and said code plate being moved relative to each other according to a variation of the focal length of said zoom lens; and a focal-length detecting circuit which is electrically connected to said three code patterns and said ground pattern of said code plate;

wherein said ground pattern of the code plate is always in contact with a specific sliding contact of said three sliding contacts regardless of the relative position of said code plate and said brush, wherein said three code patterns of the code plate are arranged so that the three code patterns come into contact with a remaining two of said three sliding contacts in predetermined combinations when said code plate and said brush are moved relative to each other, two of said three code patterns being formed as two repetitive-pattern detecting terminals for detecting intermediate focal lengths between a wide-angle extremity and a telephoto extremity of said zoom lens, the two repetitive-pattern detecting terminals having code patterns that, in combination with the remaining two of said three sliding contacts, generate non-unique codes for detecting relative focal length movement of said zoom lens, and wherein a remaining one of said three code patterns is formed as a specific-code detecting terminal for detecting specific focal length positions of said zoom lens.

16. The focal length detector according to claim 15, wherein two of said three code patterns, in combination with said remaining two of said three sliding contacts, generating two-bit predetermined combinations over the range of focal length detection of the brush, and a remaining one of said three code patterns, in combination with a predetermined one of said remaining sliding contacts, generating one-bit predetermined combinations, independent of said two-bit predetermined combinations, over the range of focal length detection of the brush.

\* \* \* \* \*

UNITED STATES PATENT AND TRADEMARK OFFICE
CERTIFICATE OF CORRECTION

PATENT NO. : 6,263,163 B1
DATED : July 17, 2001
INVENTOR(S) : Takamitsu Sasaki et al.

It is certified that error appears in the above-identified patent and that said Letters Patent is hereby corrected as shown below:

<u>Title page,</u>
Item [73], Assignee, "Asahi Kogyo Kabushiki Kaisha, Tokyo (JP)" should be
-- Asahi Kogaku Kogyo Kabushiki Kaisha, Tokyo (JP) --

Signed and Sealed this

Fifteenth Day of January, 2002

Attest:

Attesting Officer

JAMES E. ROGAN
*Director of the United States Patent and Trademark Office*